:::United States Patent Office 3,009,930
Patented Nov. 21, 1961

3,009,930
6-FLUORO-9α,11β-DIHALO-PROGESTERONE
Hans Reimann, Bloomfield, and David H. Gould, Leonia, N.J., assignors to Schering Corporation, Bloomfield, N.J., a corporation of New Jersey
No Drawing. Filed June 1, 1959, Ser. No. 817,051
9 Claims. (Cl. 260—397.3)

This invention relates to novel and therapeutically useful halogenated steroids and to methods for their manufacture. In particular, this invention relates to 6-substituted-9α,11β-dihalogenated derivatives of progesterone which exhibit valuable progestational properties.

Our novel compounds may be represented by the following formula:

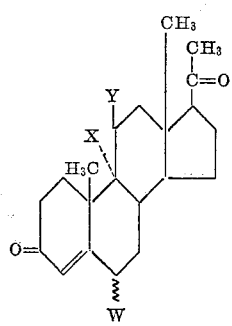

wherein W is fluorine; X is a halogen having an atomic weight greater than 19; Y is a halogen having an atomic weight less than 126 and being at least as electronegative as X; the 19-nor, and 1-dehydro analogs thereof. These novel compounds are thus 6,9,11-trihalogenated analogs of progesterone, 19-norprogesterone and 1-dehydroprogesterone. The bond designated by a wavy line (∼) in the above general formula indicates that the substituent at the 6-carbon may be in either an α- or β-position. In this application, whenever the configuration at C–6 is not specifically designated as α or β, either epimer is included. Thus, the name 6-methylprogesterone encompasses the two isomeric configurations, namely 6α-methylprogresterone and 6β-methylprogesterone.

In the above formula, the halogen at C–11 must be at least as electronegative as the halogen present in the 9α-position (fluorine being the most electronegative halogen, and iodine the least electronegative) and further cannot be iodo. Thus, a progesterone of our invention containing a 9α-chloro group may possess an 11β-chloro or an 11β-fluoro group, but cannot contain an 11β-iodo or 11β-bromo group. This artificial restriction as to the electronegativity of the 9- and 11-substituents is necessarily imposed in view of the limitations of the manufacturing process developed below.

Typical progestins embraced by the general formula are 6-fluoro-9α,11β-dichloroprogesterones, 6,11β-difluoro-9α-bromoprogesterones, 6α,11β-difluoro-9α - iodoprogesterone as well as their Δ¹-dehydro analogs. Although all the compounds of our invention are, in general, valuable progestins, the 6α-substituted-9α,11β-dihalogenated progesterones are the preferred species and particularly the 9α,11β-dichloro derivatives, i.e. 6α-fluoro-9α,11β-dichloroprogesterone.

Our novel compounds are prepared by reacting 6-fluoro-4,9(11)-pregnadiene-3,20-dione (or 6 - fluoro-1,4,9(11)-pregnatriene-3,20-dione) with a suitable halogenating agent. The starting materials necessarily possess a Δ$^{9,11}$-bond, and are prepared by a combination of processes analogous to those described in the literature. For example, the starting compounds 6α-fluoro-4,9(11)-pregnadiene-3,20-dione (6α-fluoro-9(11) - dehydroprogesterone) and 6β-fluoro-4,9(11)-pregnadiene - 3,20-dione (6β-fluoro-9(11)-dehydroprogesterone) are prepared from 6α-fluoro-11β-hydroxyprogesterone and 6β-fluoro-11β-hydroxyprogesterone by dehydration as effected by reagents such as methanesulfonyl chloride in the presence of pyridine or phosphorus oxychloride in pyridine. The 1-dehydro intermediates, i.e. 6-fluoro-1,4,9(11)-pregnatriene-3,20-diones (6-fluoro - 1,9(11)-bisdehydroprogesterone) is prepared from the 6-fluoro-9(11)-dehydroprogesterones by microbiological dehydrogenation with an organism such as, for example, Corynebacterium simplex (A.T.C.C. 6946) in a manner similar to that described in U.S. Patent No. 2,837,-464, or by chemical dehydrogenation through the use of such reagents as chloranil or selenium dioxide.

Halogenating agents suitable for use in our process are:

(1) Molecular halogens having a molecular weight greater than 38 and less than 253. This class includes heteroatomic halogen molecules such as iodine monochloride as well as isoatomic halogen molecules such as chlorine and bromine. The molecular halogen employed may be used alone or in admixture with a halide anion. In reactions employing isoatomic molecular halogens, an anion corresponding to the molecular halogen is used. For example, in reactions using molecular chlorine, a suitable chloride salt such as lithium chloride or hydrochloric acid are suitable anion sources. In reactions which employ a heteroatomic molecular halogen, a source of the more electronegative anion is used, i.e. a suitable chloride salt or hydrochloric acid is used in a reaction employing iodine monochloride.

(2) Addition compounds of molecular halogens, said molecular halogens having a molecular weight greater than 38 and less than 253. Examples of such addition compounds are pyridinium bromide perbromide, pyridinium chloride perchloride, dioxane dibromide, iodobenzene dichloride, and the like.

(3) N-haloamides in admixture with a halide anion, the halogen in the halide being at least as electronegative as the halogen cation in the N-haloamide, and the combined molecular weight of said halogens being greater than 38 and less than 253. N-haloamides used in these mixtures are such as N-chlorosuccinimide, N-bromoacetamide, dimethyl - N,N-dibromohydantoin, N-iodosuccinimide and the like. Examples of mixtures of N-haloamide and a halide are such as N-chlorosuccinimide and hydrogen chloride; N-bromoacetamide and hydrogen bromide; N-bromoacetamide and lithium chloride; N-bromoacetamide and hydrogen fluoride; N-iodosuccinimide and sodium chloride. These mixtures may have more than one source of halide ion such as in the reagent combination N-chlorosuccinimide, hydrogen chloride and lithium chloride.

Molecular halogens (both isoatomic and heteroatomic) such as chlorine, bromine and iodine monochloride, and molecular halogen addition compounds such as iodobenzene dichloride or pyridinium bromide perbromide employed in our process may be used directly in their commercially available form, in which case they are added directly to the reaction mixture either alone or in a suitable non-reacting solvent such as acetic acid or tetrahydrofuran. The halogenating agent is preferably used in approximately equivalent quantities to that of the steroid.

Alternatively, the halogenating reactant may be prepared in situ. For example, 0.9–1.2 equivalents of halogen cation (based on the amount of steroid) such as is obtained from N-bromosuccinimide is added to a reaction mixture containing a halogen anion of greater or equal electronegativity than the cationic reagent. The halogen anion may be supplied by a hydrohalic acid or by a salt such as sodium bromide, lithium chloride, potassium fluoride, or by mixtures of a hydrohalic acid with an alkali metal halide. Whenever an acid is the source of a halogen anion, approximately theoretical quantities are generally used; whereas if a salt is used as the halogen anion source it may be present in large excess. Such an excess of anion is frequently useful to obtain an increased yield or greater purity of product.

Thus, each of our novel compounds may be prepared by any one of several methods. For example, 6α-fluoro-9α,11β-dichloroprogesterone may be prepared from 6α-fluoro-9(11)-dehydroprogesterone by utilizing such reagents and combinations as: (1) chlorine and lithium chloride, (2) N-chloro-succinimide and lithium chloride, (3) sodium chloride, N-chlorosuccinimide together with hydrogen chloride, (4) chlorine alone, (5) chlorine and hydrogen chloride, and (6) iodobenzene dichloride.

A 6-substituted-9α,11β-dihalogeno-1-dehydroprogesterone falling under the general formula such as, for example, 6α-fluoro-9α,11β-dichloro-1-dehydroprogesterone may be prepared from 6α-fluoro-1,9(11)-bisdehydroprogesterone by utilizing any one of the six reagents and combinations listed above. In addition, our novel 1-dehydrohalogenated progesterones are obtained from the corresponding halogenated progesterones by micro-biological or chemical dehydrogenation techniques as heretofore described. Thus, 6α-fluoro-9α,11β-dichloroprogesterone is converted to 6α-fluoro-9α,11β-dichloro-1-dehydroprogesterone by the action of a culture of the microorganism *Corynebacterium simplex*.

Our process, whereby a 6-substituted-9(11)-dehydroprogesterone is converted to a 6-substituted-9α,11β-dihalogeno derivative, is generally carried out in the presence of a non-reacting solvent at temperatures ranging from 5° C. to 50° C. with reaction times varying from one-half hour to 24 hours, depending on the reagents involved. It is preferred that the halogen cation source be present in amounts of 0.9–1.2 equivalents based upon the amount of steroid. The choice of solvent in each reaction is naturally determined by the solubility of the reactants in the process. A preferred reaction condition employs glacial acetic acid as the sole or major solvent with the reaction being carried out at room temperature for a period of approximately two hours.

Although glacial acetic acid is frequently the preferred solvent, other solvents are used in our dihalogenation process either alone or in combination with acetic acid. Other solvents which may be employed include lower aliphatic acids such as propionic and diethylacetic, halogenated hydrocarbons such as methylene chloride and chloroform, saturated ethers such as tetrahydrofuran and dioxane, and inert solvents such as dimethylsulfoxide, as well as suitable mixtures of these solvents.

Further, when carrying out the above described process in a halogenated hydrocarbon solvent such as methylene chloride, chloroform or carbon tetrachloride, the yield and purity of the dihalogenated progesterone obtained is greatly increased by adding pyridine to the reaction mixture. Preferably up to ten equivalents of pyridine are added and usually one to four, based on the amount of steroid being converted. Other organic basic agents which may also be used in conjunction with a halogenated hydrocarbon solvent are aromatic tertiary amines such as lutidine, collidine, alkyl substituted pyridines and the like. The reaction is usually carried out initially at −20° C. with subsequent warming to about room temperature. The reaction time may be as short as five minutes or as long as one hour. In general, the optimum reaction time is about fifteen minutes.

Our process whereby a 6-substituted-9(11)-dehydroprogesterone is converted to a 6-substituted-9α,11β-dihalogenoprogesterone is also applicable to 6-substituted-9(11)-dehydro-19-norprogesterones. With the aforementioned 9(11)-dehydro-19-norprogesterones there are produced the novel progestational agents, 6-W-9α-X-11β-Y-19-norprogesterones wherein W, X and Y are as heretofore described. Thus, 6-fluoro-4,9(11)-pregnadiene-3,20-diones (6-fluoro-9(11)-dehydro-19-norprogesterones) when reacted with chlorine in carbon tetrachloride in the presence of pyridine, for example, are converted to their respective 9α,11β-dichloro derivatives. The necessary intermediates, i.e. the 6-substituted-9(11)-dehydro-19-norprogesterones are prepared by using procedures analogous to those known in the art. 19-norprogesterone is treated with ethylene glycol by known procedures to form the 3,20-bisethylene ketal derivative which, in turn, is epoxidized on treatment with, for example, monoperphthalic acid to give 5α,6α-epoxy-19-norpregnane-3,20-dione 3,20-bisethylene ketal. From this epoxy intermediate the 6-fluoro substituent is introduced into the 19-norpregnane nucleus, using techniques described in the literature. Thus, the action of hydrofluoric acid on the epoxy bisethylene ketal intermediate opens the epoxy ring and upon subsequent acid hydrolysis of the bisethylene ketal groups with, for example, oxalic or dilute sulfuric acid yields 5α-hydroxy-6β-fluoro-19-norpregnane-3,20-dione. A reagent such as ethanolic hydrochloric acid acting on 5α-hydroxy-6β-substituted-19-norpregnanes simultaneously dehydrates the hydroxy group and epimerizes the 6β-constituent to yield, 6α-fluoro-19-norprogesterone. In order to obtain a 6-substituent in the β-position, a 5α-hydroxy-6β-substituted intermediate is treated with, for example, thionyl chloride in a cold basic medium such as pyridine. The double bond between C-9 and C-11 is then introduced into the 6-substituted-19-norprogesterone via the 11β-hydroxy derivative using procedures outlined heretofore to give the necessary intermediates, 6α-fluoro-9(11)-dehydro-19-norprogesterone, 6β-fluoro-9(11)-dehydro-19-norprogesterone.

Our novel dihalogenated progesterones, their 1-dehydro and their 19-nor analogs are active progestational agents by both oral and intramuscular routes, being specific in their action and devoid of androgenic, estrogenic or corticoid activity. That our compounds have progestational activity at all is surprising in view of the art which teaches that the introduction of substituents into the C-ring of progesterone and its derivatives, such as for example, 11β-hydroxyprogesterone and the acetate thereof, eliminates progestational activity or reduces it to such an extent that the compounds are useless for therapeutic purposes. Our C-ring halogen substituted progesterones, on the other hand, are significantly more active than progesterone by the intramuscular route. Orally our compounds are comparable in activity to ethisterone, the known standard progestational agent.

In addition to being active both orally and intramuscularly, our halogenated progestins possess the added advantage of having a minimum effect on water, sodium and potassium metabolism. Thus they may be administered without causing the usual side effects associated with electrolyte imbalance.

Our therapeutically active compounds are useful for the treatment of conditions requiring progestational agents such as the maintenance of pregnancy, or treatment of functional dysmenorrhea, premenstrual tension, habitual or threatened abortion. When administered orally, our compounds are preferably used in the form of tablets containing from 10 to 100 mg. together with the excipients such as starch or milk sugar. For subcutaneous and intramuscular administration, solutions or suspensions of our compounds with a non-toxic liquid vehicle are used. The dosage required may vary with the indications being treated and may range from about 10 to 25 mg. daily.

Our halogenated progestins are also valuable in the veterinary field for treating conditions in both large and small animals which require a progestational agent. In breeding animals, for example, our compounds are useful in preventing threatened abortion. Additional uses are in controlling egg and milk production by regulating the cycle of chickens and cows by the administration of our progestational agents.

The following examples are illustrative of the procedures employed in preparing the compounds of this invention, but are not to be construed as limiting the scope thereof; the scope of our invention being limited only by the appended claims.

EXAMPLE 1

*6β-methyl-4,9(11)-pregnadiene-3,20-dione*

A. 6β-METHYL-11β-HYDROXYPROGESTERONE

A living culture of the organism *Curvularia lunata* (N.R.R.L. 2380) is rinsed from an agar slant under sterile conditions into a sterile medium having the following composition:

|  | Percent |
| --- | --- |
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |

Distilled water, adjusted to pH 7.0 potassium by hydroxide.

100 ml. of this medium is placed in each of several 300 ml. flasks. To each flask is added 50 mg. of 6β-methylprogesterone dissolved in a small volume of acetone. The mixture is shaken for a period of 7 days at a room temperature of about 28° C. The contents of the flasks are then combined and extracted with several portions of ethylene dichloride using one-fifth the volume of the aqueous phase each time. The combined organic extracts are dried over sodium sulfate, filtered and concentrated in vacuo to a residue having a volume of 1-2 ml.

The ethylene dichloride residue is then placed on a chromatographic column consisting of silica gel, mixed with a small volume of methylene chloride. The column is developed with methylene chloride and the eluates are combined and concentrated in vacuo to a residue which is crystallized from acetone-hexane to give 6β-methyl-11β-hydroxyprogesterone.

B. 6β-METHYL-4,9(11)-PREGNADIENE-3,20-DIONE

A solution of 3 g. of 6β-methyl-11β-hydroxyprogesterone (the compound of Example 1A) in a mixture of 20 ml. of dimethylformamide and 5 ml. of dry pyridine is chilled in an ice-bath and then there is added dropwise a solution of 3.2 g. of methanesulfonyl chloride in 30 ml. of dimethylformamide. Stirring is continued at room temperature for 28 hours, after which the mixture is poured into ice-water. A precipitate forms which is filtered, washed with water and crystallized from acetone-hexane to give 6β-methyl-4,9(11)-pregnadiene-3,20-dione.

EXAMPLE 2

*6β-fluoro-4,9(11)-pregnadiene-3,20-dione*

Two grams of 6β-fluoro-11β-hydroxyprogesterone is reacted with methanesulfonyl chloride in dimethylformamide-pyridine in the manner described in Example 1B. The resultant product is isolated in the described manner and crystallized twice from acetone-hexane to give

*6β-fluoro-4,9(11)-pregnadiene-3,20-dione*

EXAMPLE 3

*6β-fluoro-9α,11β-dichloroprogesterone*

One gram of 6β-fluoro-4,9(11)-pregnadiene-3,20-dione (the compound of Example 2), is dissolved in 30 ml. of carbon tetrachloride at −20° C. and is chlorinated with 220 mg. of chlorine gas in 3 ml. of carbon tetrachloride in the presence of 0.65 ml. of pyridine. The mixture is stirred at −20° C. for 15 minutes and allowed to warm to room temperature over a period of ½ hour. The resultant solution is filtered, the filtrate concentrated in vacuo to a residue, triturated with ether and crystallized from methylene chloride-hexane and recrystallized from acetone-hexane to give 6β-fluoro-9α,11β-dichloroprogesterone.

EXAMPLE 4

*6β,11β-difluoro-9α-bromoprogesterone*

1 g. of 6β-fluoro-4,9(11)-pregnadiene-3,20-dione (the compound of Example 2) and 450 mg. of N-bromoacetamide is dissolved in 50 ml. of diethylacetic acid and there is added a solution of 500 mg. of hydrogen fluoride in 20 ml. of diethylacetic acid. The solution is stirred at room temperature for 2 hours and poured into cold sodium carbonate solution and stirred for 15 minutes. A precipitate forms which is dissolved in acetone-ether and filtered through a column of Fluorsil in ether. The product is eluted with ether, the combined eluates distilled in vacuo, the resultant residue triturated with ether-pentane and crystallized from methylene chloride to give the product of this example.

EXAMPLE 5

*6β,11β-difluoro-9α-iodoprogesterone*

To a solution of 500 mg. of 6β-fluoro-4,9(11)-pregnadiene-3,20-dione (the compound of Example 2) and 3 g. of potassium fluoroide in 40 ml. of dimethylsulfoxide, there is added 306 mg. of N-iodosuccinimide. The reaction mixture is stirred at room temperature for 16 hours, poured into ice water and extracted with methylene chloride. The organic extracts are then treated with decolorizing carbon and concentrated in vacuo. The resultant residue is chromatographed on silica gel. The fraction eluted with 45% ether-hexane yields 6β,11β-difluoro-9α-iodoprogesterone.

EXAMPLE 6

*6α-fluoro-4,9(11)-pregnadiene-3,20-dione*

Five grams of 6α-fluoro-11β-hydroxyprogesterone in a mixture of dimethylformamide and pyridine is reacted with methanesulfonyl chloride in the manner described in Example 1. The resultant product is isolated in the described manner and crystallized from acetone-hexane to give 6α-fluoro-4,9(11)-pregnadiene-3,20-dione.

EXAMPLE 7

*6α-fluoro-9α,11β-dichloroprogesterone*

One gram of 6α-fluoro-4,9(11)-pregnadiene-3,20-dione (the compound of Example 6) and 4 g. of lithium chloride dissolved in 50 ml. of glacial acetic acid are cooled to about 10° C. and there is added about 250 mg. of hydrogen chloride dissolved in 1 ml. of tetrahydrofuran followed by 450 mg. of N-chlorosuccinimide. The solution is stirred at room temperature for 20 minutes in the absence of light and then is poured into ice-water with stirring. A solid product separates which is filtered, washed with water, triturated with ether and crystallized from acetone-hexane to give 6α-fluoro-9α,11β-dichloroprogesterone.

Alternatively, the compound of this example is prepared by dissolving 200 mg. of 6β-fluoro-9α,11β-dichloroprogesterone (the compound of Example 3) in 20 ml. of acetic acid and bubbling gaseous hydrogen chloride into the solution for 2 hours at about 15° C. The reaction mixture is poured into ice water. A solid separates which is filtered, washed with water, and crystallized twice from acetone-hexane to give 6α-fluoro-9α,11β-dichloroprogesterone.

EXAMPLE 8

*6α,11β-difluoro-9α-bromoprogesterone*

One gram of 6α-fluoro-4,9(11)-pregnadiene-3,20-dione (the compound of Example 6) is reacted with 450 mg. of N-bromoacetamide and 500 mg. of hydrogen fluoride in diethylacetic acid in the manner described in Example 4. The product is isolated in the described manner and crystallized from methylene chloride-pentane to give 6α,11β-difluoro-9α-bromoprogesterone.

Alternatively, the compound of this example may be prepared from 6β,11β-difluoro-9α-bromoprogesterone (the compound of Example 4) by treating it with gaseous hydrogen chloride in acetic acid in the manner described in the alternative procedure of Example 7.

EXAMPLE 9

*6α,11β-difluoro-9α-iodoprogesterone*

500 mg. of 6α-fluoro-4,9(11)-pregnadiene-3,20-dione (the compound of Example 6) is reacted with 3 g. of potassium fluoride and 306 mg. of N-iodosuccinimide in dimethylsulfoxide in the manner described in Example 5. The resultant product is isolated and purified in the described manner to give 6α,11β-difluoro-9α-iodoprogesterone.

Alternatively, the compound of this example may be prepared by treating 6β,11β-difluoro-9α-iodoprogesterone (the compound of Example 5) with gaseous hydrogen chloride in acetic acid in the manner described in the alternative procedure of Example 7.

EXAMPLE 10

*6α-fluoro-9α,11β-dibromoprogesterone*

6β-fluoro-4,9(11)-pregnadiene-3,20-dione (the compound of Example 6) is reacted with N-bromoacetamide and hydrogen bromide in acetic acid in the presence of lithium bromide by preparing a solution of 1 g. of the steroid and 4 g. of lithium bromide in 50 ml. of acetic acid. Adding to the solution 410 mg. of N-bromoacetamide followed by a solution of 240 mg. of hydrogen bromide in 5 ml. of acetic acid. The mixture is stirred at room temperature for one hour and poured into ice water. The resultant product is filtered, washed with water, and crystallized and recrystallized from acetone-hexane to give the product of this example.

EXAMPLE 11

*6β-fluoro-1,4,9(11)-pregnatriene-3,20-dione*

Five grams of 6β-fluoro-4,9(11)-pregnadiene-3,20-dione is fermented with Corynebacterium simplex (A.T.C.C. 6946) according to the procedure of U.S. Patent No. 2,837,464 as follows.

A 100 ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmeyer flask, is seeded with 1 ml. of a 24-hour broth culture of Corynebacterium simplex (A.T.C.C. 6946). The flask is incubated at 28° C. for 24 hours. A second 300 ml. Erlenmeyer flask containing 150 mg. of sterile 6β-fluoro-4,9(11)-pregnadiene-3,20-dione (the compound of Example 6) in 5.0 ml. acetone is inoculated with the 24 hour culture of Corynebacterium simplex (A.T.C.C. 6946). The culture-containing steroid solution is incubated for 48 hours at 28–30° C. After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 6β-fluoro-1,4,9(11)-pregnatriene-3,20-dione.

In like manner, the compounds of Examples 2 through 10, when subjected to the action of a culture of the microorganism Corynebacterium simplex (in the manner described in Example 11) are converted respectively to the following compounds:

6β-fluoro-1,4,9(11)-pregnatriene-3,20-dione,
6-β-fluoro-9α,11β-dichloro-1,4-pregnadiene-3,20-dione,
6β,11β-difluoro-9α-bromo-1,4-pregnadiene-3,20-dione,
6β,11β-difluoro-9α-iodo-1,4-pregnadiene-3,20-dione,
6α-fluoro-1,4,9(11)-pregnatriene-3,20-dione,
6α-fluoro-9α,11β-dichloro-1,4-pregnadiene-3,20-dione,
6α,11β-difluoro-9α-bromo-1,4-pregnadiene-3,20-dione,
6α,11β-difluoro-9α-iodo-1,4-pregnadiene-3,20-dione, and
6α-fluoro-9α,11β-dibromo-1,4-pregnadiene-3,20-dione.

Alternatively, 6α-fluoro-1,4,9(11)-pregnatriene-3,20-dione, and 6β-fluoro-1,4,9(11)-pregnatriene-3,20-dione (prepared as described in the above paragraph) are reacted with halogenating reagents and combinations of reagents in the manner described in the preceding examples and the resultant product isolated and purified to yield the corresponding 9α,11β-dihalogeno-derivatives which are listed in the above paragraph.

We claim:

1. A compound of the group consisting of 6-W-9α-X-11β-Y-progesterones, 6-W-9α-X-11β-Y-19-norprogesterones and 6-W-9α-X-11β-Y-1-dehydrogesterones wherein W is fluorine; X is a halogen having an atomic weight greater than 19; and Y is a halogen having an atomic weight less than 126 and being at least as electronegative as X.

2. 9α-X-11β-Y-6-fluoroprogesterone wherein X is a halogen having an atomic weight greater than 19; and Y is a halogen having an atomic weight less than 126 and being at least as electronegative as X.

3. 9α-X-11β-Y-6-fluoro-1-dehydrogesterone wherein X is a halogen having an atomic weight greater than 19; and Y is a halogen having an atomic weight less than 126 and being at least as electronegative as X.

4. 6α-fluoro-9α,11β-dichloroprogesterone.
5. 6β-fluoro-9α,11β-dichloroprogesterone.
6. 6α-fluoro-9α,11β-dichloro-1-dehydrogesterone.
7. 6β-fluoro-9α,11β-dichloro-1-dehydroprogesterone.
8. 6β,11β-difluoro-9α-bromoprogesterone.
9. 6α,11β-difluoro-9α-bromoprogesterone.

References Cited in the file of this patent

UNITED STATES PATENTS

| | | |
|---|---|---|
| 2,841,531 | Wettstein et al. | July 1, 1958 |
| 2,852,511 | Fried | Sept. 16, 1958 |
| 2,864,837 | Sebek et al. | Dec. 16, 1958 |
| 2,867,635 | Lincoln et al. | Jan. 6, 1959 |
| 2,867,636 | Lincoln et al. | Jan. 6, 1959 |
| 2,880,205 | Campbell et al. | Mar. 31, 1959 |

OTHER REFERENCES

Cooley et al.: J.C.S. (1957), pages 4112–4116.